(12) United States Patent
Wu

(10) Patent No.: US 12,520,819 B2
(45) Date of Patent: Jan. 13, 2026

(54) PET FEEDING DEVICE

(71) Applicant: Shenzhen Ipetmon Creative Technology Co., Ltd., Shenzhen (CN)

(72) Inventor: Danyang Wu, Shenzhen (CN)

(73) Assignee: Shenzhen Ipetmon Creative Technology Co., Ltd., Shenzhen (CN)

( * ) Notice: Subject to any disclaimer, the term of this patent is extended or adjusted under 35 U.S.C. 154(b) by 25 days.

(21) Appl. No.: 18/408,156

(22) Filed: Jan. 9, 2024

(65) Prior Publication Data

US 2024/0306601 A1  Sep. 19, 2024

(30) Foreign Application Priority Data

Mar. 16, 2023 (CN) .......................... 202310290366.6
Mar. 30, 2023 (CN) .......................... 202310377540.0

(51) Int. Cl.
*A01K 5/02* (2006.01)

(52) U.S. Cl.
CPC ................................ *A01K 5/0291* (2013.01)

(58) Field of Classification Search
CPC ...... A01K 5/02; A01K 5/0225; A01K 5/0275; A01K 5/0291; A01K 5/0114; A01K 5/0241

See application file for complete search history.

(56) References Cited

U.S. PATENT DOCUMENTS

| 2022/0312727 A1* | 10/2022 | Zhang ................. A01K 5/0225 |
| 2023/0157258 A1* | 5/2023 | Chen ................... A01K 5/0225 119/57.92 |

FOREIGN PATENT DOCUMENTS

| CN | 106665399 A | * | 5/2017 | |
| CN | 111512986 A | * | 8/2020 | .............. A01K 5/01 |
| CN | 211983203 U | * | 11/2020 | |
| CN | 212138840 U | * | 12/2020 | |
| CN | 113575449 A | * | 11/2021 | |
| CN | 114766380 A | * | 7/2022 | |
| CN | 114931102 A | * | 8/2022 | |
| CN | 217136415 U | * | 8/2022 | |
| CN | 217905699 U | * | 11/2022 | |
| CN | 218337446 U | * | 1/2023 | |

* cited by examiner

*Primary Examiner* — Peter M Poon
*Assistant Examiner* — Shada Mohamed Alghailani

(57) ABSTRACT

A pet feeding device includes a grain storage bin with at least two grain leakage mouths at a lower portion thereof, a pushing granary arranged below the grain storage bin and including at least two grain inlets respectively set opposite to the at least two grain leakage mouths, and at least two grain outlets staggered with the at least two grain inlets; a grain pusher rotatably arranged inside the pushing granary, and at least two grain bowls arranged below the at least two grain outlets respectively; the grain pusher configured to push pet food within the pushing granary to the at least two grain outlets, and flows into the at least two grain bowls; the plurality of grain bowls with relatively long distances thereamong is used by a plurality of pets simultaneously, which weakens a sense of pet territory and avoids a problem of pets competing due to food protection.

11 Claims, 9 Drawing Sheets

US 12,520,819 B2

PET FEEDING DEVICE

CROSS-REFERENCE TO RELATED APPLICATION

This application claims the benefit of priority from Chinese Patent Application No. 202310290366.6 entitled "PET FEEDING DEVICE" and filed on Mar. 16, 2023, and Chinese Patent Application No. 202310377540.0 entitled "PET FEEDING DEVICE WITH UNIFORM FOOD DISTRIBUTION" and filed on Mar. 30, 2023, the content of which is hereby incorporated by reference in its entire by reference.

BACKGROUND

Technical Field

The present disclosure generally relates to the field of pet articles, and especially relates to a pet feeding device.

Description of Related Art

An automatic pet feeding device is configured to automatically flow pet food out of a grain storage bin of the pet feeding device and then flow into a grain bowl, in order to implement a purpose of automatically feeding the pets.

The pet feeding device on the market generally includes one feeding trough or one grain bowl, and the one grain bowl can only serve one pet. If there are more than two pets, such type of feeding device is inconvenient to be used. If a plurality of pets shares the same pet feeding device with only one grain bowl, it will result in food protection.

Therefore, in order to reduce the above occurrence of such situations, it is necessary to design a pet feeding device with a plurality of grain bowls that can be used by a plurality of pets simultaneously.

SUMMARY

The technical problems to be solved: in view of the shortcomings of the related art, the present disclosure provides a pet feeding device which can solve technical problems how to simultaneously feed a plurality of pets through a plurality of grain bowls that is included in the same pet feeding device.

In a first aspect, a pet feeding device according to an embodiment of the present disclosure includes:
  a grain storage bin including at least two grain leakage mouths;
  a pushing granary arranged below the grain storage bin and including at least two grain inlets and at least two grain outlets, the at least two grain outlets correspondingly arranged below the at least two grain inlets; the at least two grain inlets set directly opposite to the at least two grain leakage mouths respectively, and the at least two grain outlets and the at least two grain inlets arranged in a staggered manner;
  a grain pusher rotatably arranged inside the pushing granary;
  at least two grain bowls arranged below the at least two grain outlets respectively; and wherein
  the grain pusher is configured to push pet food that is received in the pushing granary to the at least two grain outlets, and then flows into the at least two grain bowls respectively.

In a second aspect, a pet feeding device according to an embodiment of the present disclosure includes:
  a grain storage bin including a grain leakage mouth;
  a pushing granary arranged below the grain storage bin and including a grain inlet and a grain outlet arranged below the grain inlet; the grain inlet set directly opposite to the grain leakage mouth;
  a grain pusher rotatably arranged inside the pushing granary;
  a grain bowl arranged below the grain outlet; and wherein
  the grain pusher is made of a soft rubber material and configured to push pet food that falls from the grain leakage mouth to the grain outlet, and then flows into the grain bowl.

The present disclosure provides the advantages as below: the present disclosure provides the pet feeding device including a plurality of grain bowls that can be used by a plurality of pets simultaneously, and the plurality of grain bowls with relatively long distances thereamong is arranged on opposite sides of the pet feeding device, which weakens a sense of pet territory and avoids the problem of pets competing due to food protection; the present disclosure adopts the same transmission system for power transmission by using a simple structure; the present disclosure provides the grain baffling piece to increase usage scenarios of the pet feeding device, to avoid occurrences of grain jamming and improve uniformity of grain output.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:
  10 grain storage bin, 11 grain leakage mouth, 20 pushing granary, 21 grain inlet, 22 grain outlet, 30 grain pusher, 31 first circular portion, 32 pushing plate, 40 grain bowl, 41 clamping member, 42 positioning hole, 50 upper housing, 51 third circular wall, 52 fourth circular wall, 521 second groove, 53 fifth circular wall, 60 lower housing, A bottom wall, 61 top shell, 62 bottom shell, 63 chamber, 64 inserting member, 70 grain pushing cover, 71 first circular wall, 72 second circular wall, 73 first groove, 80 guiding chute, 81 insertion portion, 90 grain baffling piece, 91 grain baffle, 911 short baffle, 912 long baffle, 92 motor, 93 support rod, 94 digital encoding switch, 95 display screen, 96 transmission member, 97 grain baffling piece, 971 clamping portion, 972 grain baffling portion, B intermediate bin.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should be understood that terms used in the description of the present disclosure herein are only for the purpose of describing specific embodiments and are not intended to limit the present disclosure. As used in the description of the present disclosure and the appended claims, "a", "an" and "the" in a singular form are intended to include plural forms, unless the context clearly indicates otherwise.

It should also be further understood that the term "and/or" used in the description of the present disclosure and the appended claims refers to and includes any and all possible combinations of one or more of the associated listed items.

Figure 1:
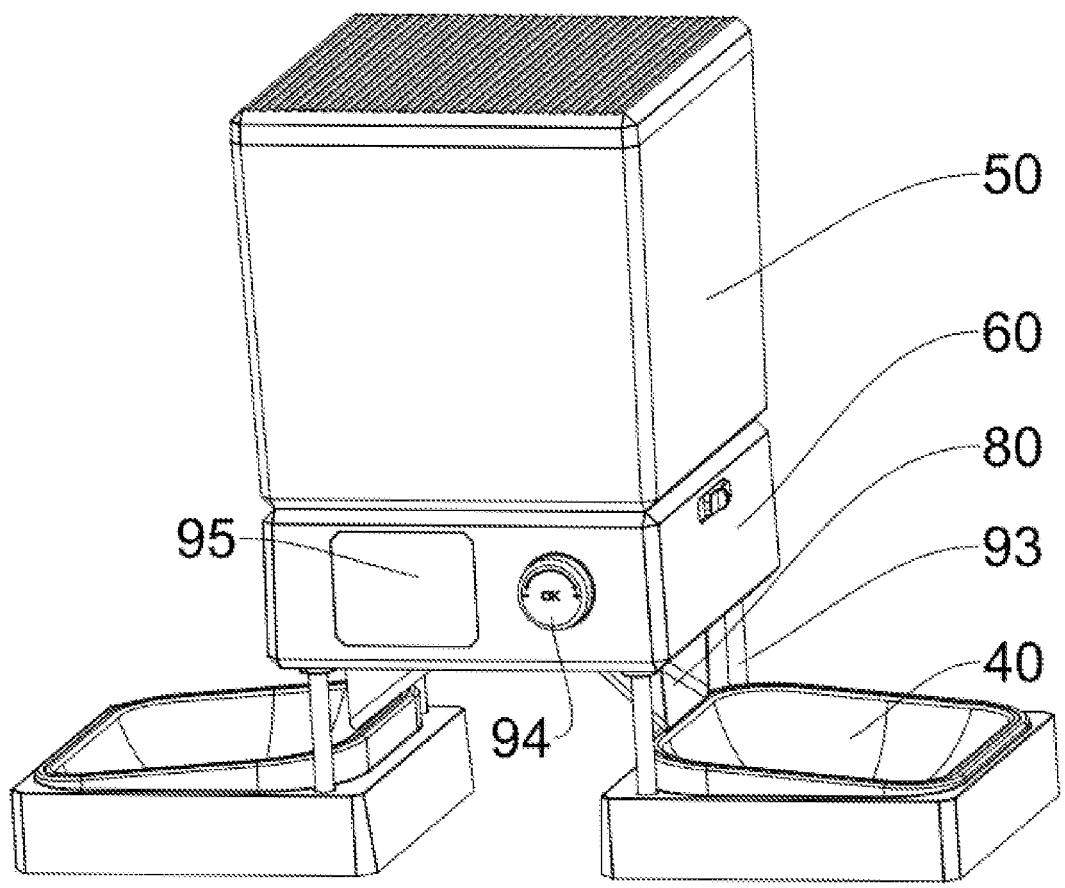
FIG. 1 is a schematic view of a pet feeding device in accordance with an embodiment of the present disclosure.
Figure 2:
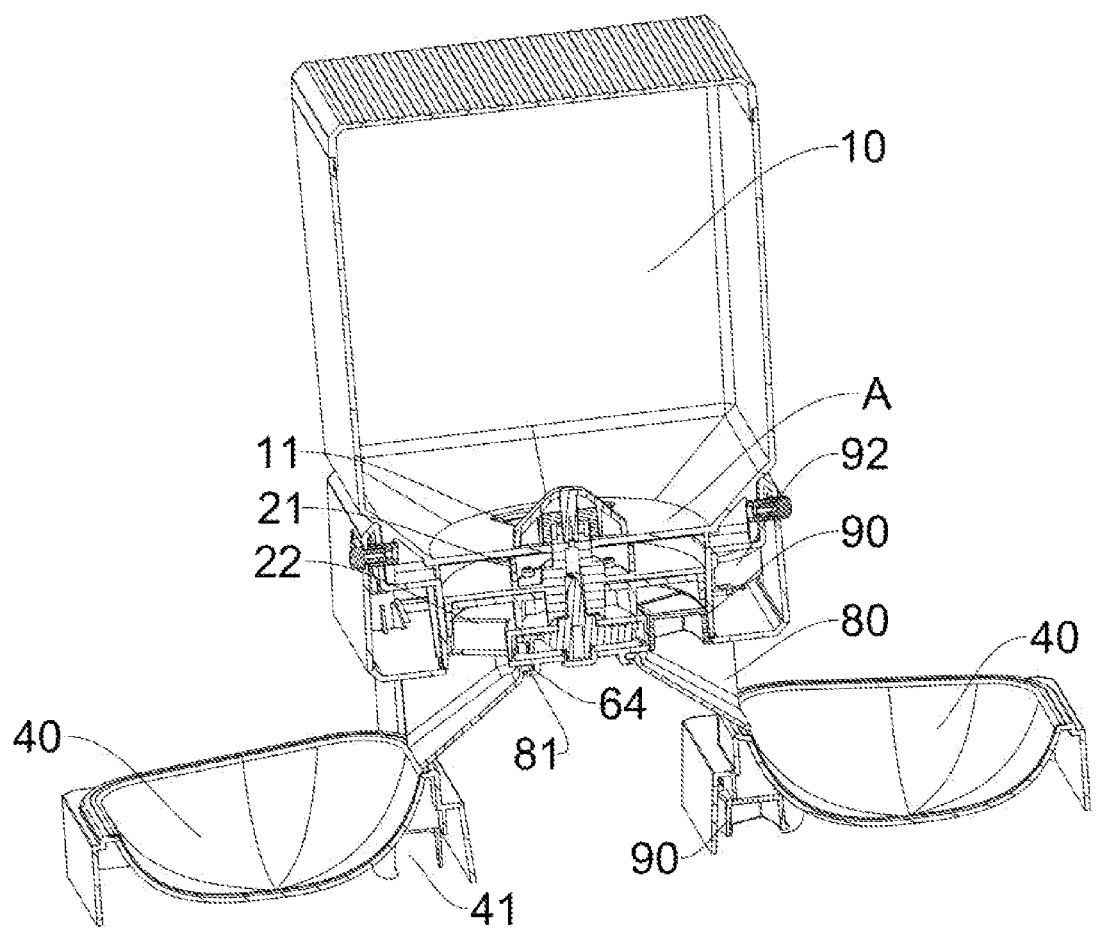
FIG. 2 is a cross sectional view of the pet feeding device of FIG. 1.
Figure 3:
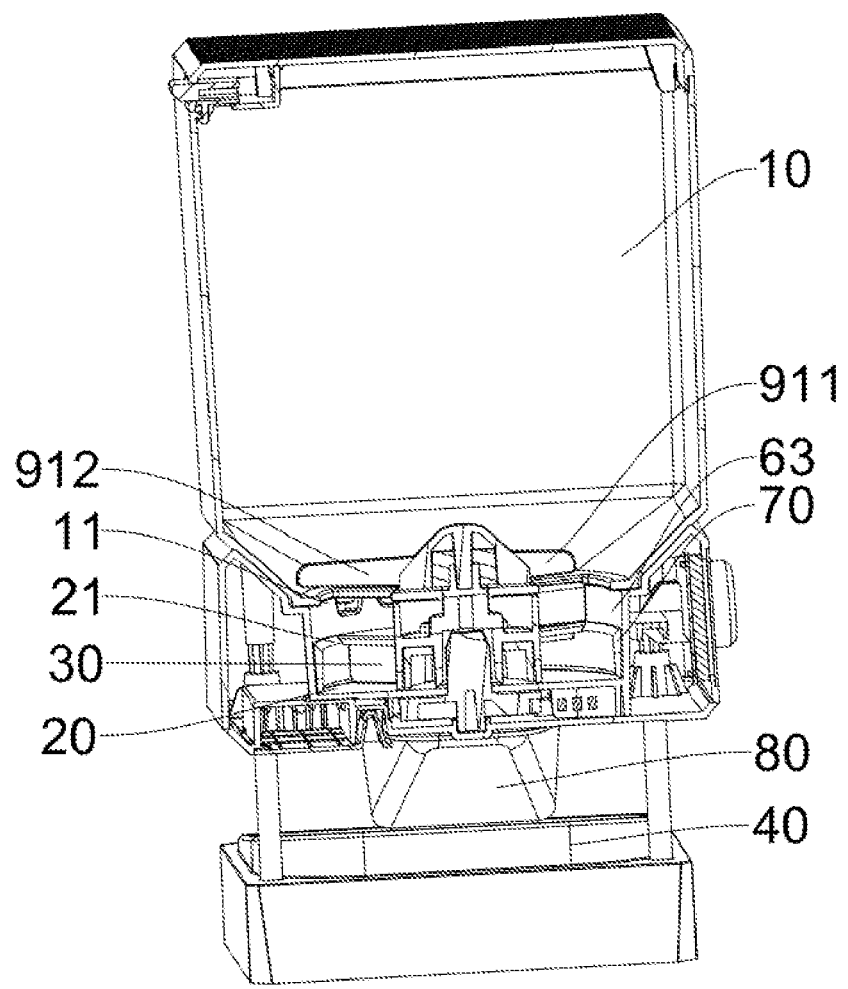
FIG. 3 is similar to FIG. 2, but shown from another view of FIG. 1.
Figure 4:
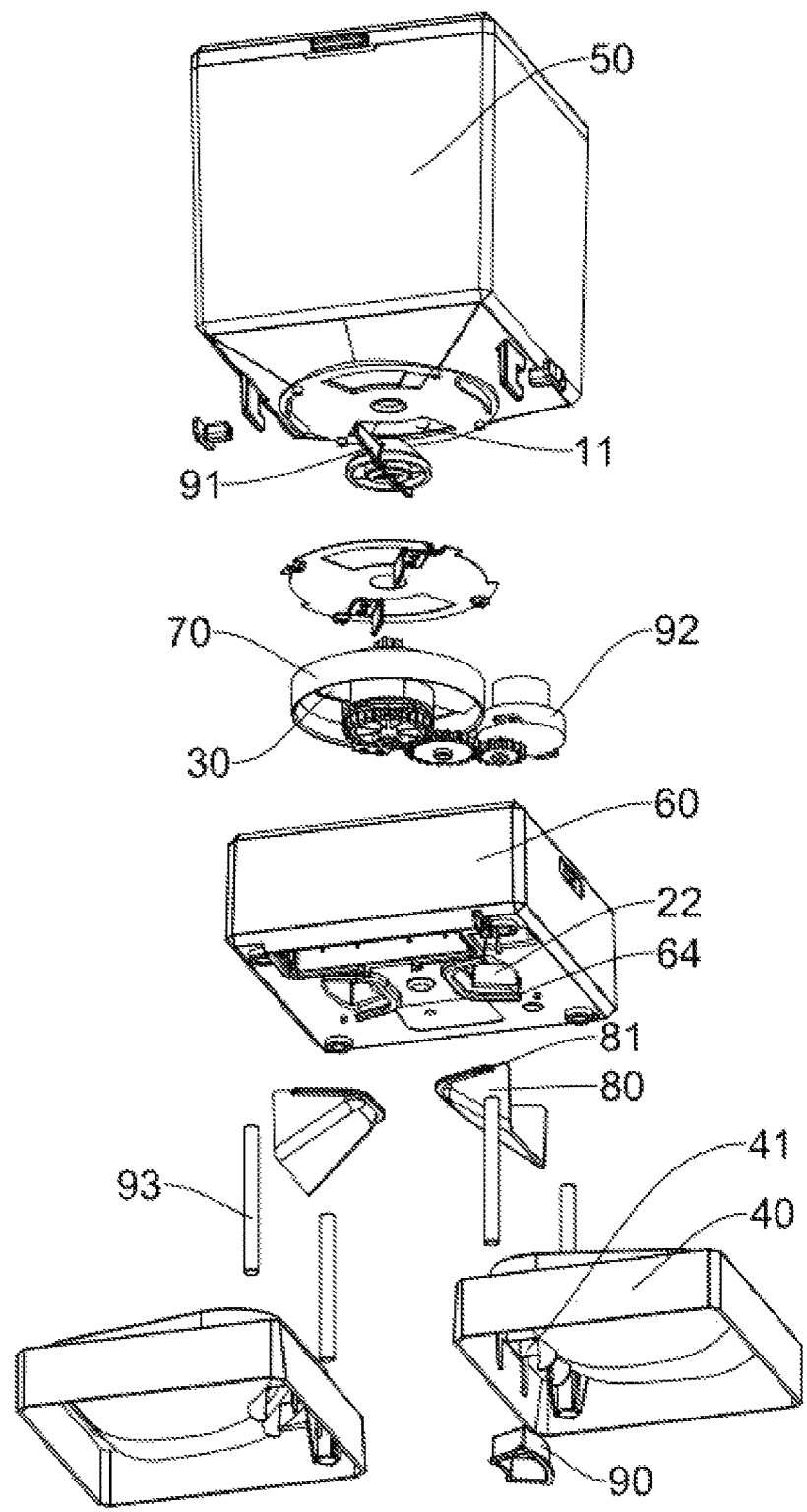
FIG. 4 is an exploded, schematic view of the pet feeding device of FIG. 1.

Referring to FIGS. 1-4, a pet feeding device according to an embodiment of the present disclosure includes a grain storage bin 10, a pushing granary 20, a grain pusher 30 and at least two grain bowls 40. The grain storage bin 10 includes at least two grain leakage mouths 11. The pushing granary 20 is arranged below the grain storage bin 10 and includes at least two grain inlets 21 and at least two grain outlets 22, the number of at least two grain inlets 21 is consistent with the number of at least two grain leakage mouths 11, and the at least two grain inlets 21 are set above the at least two grain outlets 22. The at least two grain inlets 21 are respectively set directly opposite to the at least two grain leakage mouths 11 to facilitate pet food directly fall from the at least two grain leakage mouths 11 into the pushing granary 20. The at least two grain outlets 22 and the at least two grain inlets 21 are arranged in a staggered manner, so that the pet food leaked from the at least two grain leakage mouths 11 will first deposit in the pushing granary 20, rather than directly leaking out of the at least two grain outlets 22, which provides a buffering effect; and then, a volume of the pushing granary 20 is fixed, and the at least two grain outlets 22 and the at least two grain inlets 21 are arranged in a staggered manner, it is possible to roughly control an amount of the pet food leaked out from the at least two grain outlets 22 each time, so as to facilitate quantitative control of pet food and promote healthy growths of the pets. The grain pusher 30 is rotatably arranged inside the pushing granary 20 and configured to push the pet food that is received in the pushing granary 20 to the at least two grain outlets 22 of the pushing granary 20. The at least two grain bowls 40 are arranged below the at least two grain outlets 22, respectively.

During operating the pet feeding device of the present disclosure, the pet food in the grain storage bin 10 first leaks into the at least two grain inlets 21 of the pushing granary 20 from the at least two grain leakage mouths 11 that are arranged on the bottom of the grain storage bin 10, and enters the pushing granary 20. And then, the pet food in the pushing granary 20 is pushed to the at least two grain outlets 22 through rotating the grain pusher 30, and then flows from the at least two grain outlets 22 into the at least two grain bowls 40 below the grain outlet 22 for feeding the pets. The present disclosure provides the at least two grain outlets 22 for delivering the pet food into the plurality of grain bowls 40 for feeding the plurality of pets, thereby avoiding the plurality of pets competing for the pet food of the same grain bowl 40, and promoting the plurality of pets comfort in eating the pet food.

In an optional embodiment of the present disclosure, the pet feeding device further includes an upper housing 50, a lower housing 60, and a grain pushing cover 70. The upper housing 50 is installed on the lower housing 60, the grain storage bin 10 arranged inside the upper housing 50, the pushing granary 20 arranged between the upper housing 50 and the lower housing 60, and the grain outlet 22 arranged on the lower housing 60. The lower housing 60 includes a chamber 63 and the grain pushing cover 70 is rotatably arranged within the chamber 63. A shape of the chamber 63 matches with a shape of the grain pushing cover 70. In the embodiment of the present disclosure, the chamber 63 is a cylindrical groove, and the grain pushing cover 70 is in a cover shape. A diameter of the grain pushing cover 70 is slightly smaller than an inner diameter of the chamber 63. The pushing granary 20 is formed between the grain pushing cover 70 and the chamber 63. The grain pusher 30 is arranged inside the grain pushing cover 70 and rotates synchronously with the grain pushing cover 70.

The pet feeding device also includes a plurality of guiding chutes 80, and the number of guiding chutes 80 is the same as the number of grain outlets 22. The guiding chute 80 is arranged between the grain outlet 22 and the grain bowl 40 and configured to connect the grain outlet 22 and the grain bowl 40, to guide the pet food flowing from of the grain outlet 22 into the grain bowl 40 for pets to eat. A flow direction of the pet food can be changed by the plurality of guiding chutes 80, thereby increasing a distance between each two of the plurality of grain bowls 40 to increase a distance between each two pets for eating the pet food, and reduce situations of competing with each other due to a close proximity between every two adjacent pets.

The lower housing 60 includes an inserting member 64 formed on a side of the lower housing 60 facing the grain bowl 40, and the guiding chute 80 includes an insertion portion 81 arranged on an outer edge of the guiding chute 80 and inserted into the inserting member 64. The guiding chute 80 is detachably connected with the lower housing 60 through inserting the insertion portion 81 into the inserting member 64.

In an embodiment of the present disclosure, a grain baffling piece 90 is arranged between the guiding chute 80 and the grain outlet 22 and corresponding to the grain outlet 22. The grain baffling piece 90 is configured to block one of the plurality of grain outlets 22. When there are few pets, the excess of grain outlets 22 are blocked to ensure that the pet food in the pushing granary 20 only leaks out from other grain outlets 22, which increases a usage scenario of the present disclosure. When the plurality of grain bowls 40 is needed, the insertion portion 81 of the guiding chute 80 is pulled out of the inserting member 64, and then the grain baffling piece 90 is taken out. A clamping member 41 is arranged on a side of the grain bowl 40 facing the ground and configured to receive the grain baffling piece 90 to avoid a loss of the grain baffling piece 90.

In an embodiment of the present disclosure, a plurality of support rods 93 is arranged between the lower housing 60 and the grain bowl 40, and configured to connect the lower housing 60 and the grain bowl 40 to fix the lower housing 60 together with the grain bowl 40. The plurality of support rods 90 plays a supporting role of the pet feeding device, and there is a height difference between the grain bowl 40 and the lower housing 60, and the guiding chute 80 is arranged between the grain bowl 40 and the lower housing 60. The guiding chute 80 has an inclined groove-shaped member to connect the grain outlet 22 and the grain bowl 40, so that the pet food can flow from the grain outlet 22 along the guiding chute 80 into the grain bowl 40 under an action of gravity.

Specifically, the grain bowl 40 includes a positioning hole 42, and the lower housing 60 also includes the positioning hole 42 formed at the bottom thereof. The support rod 93 is inserted into the positioning hole 42 to fix the lower housing 60 and the grain bowl 40. A current pet feeding device on the market is designed as a straight-tube structure, which means that in order to ensure a distance between the grain bowl 40 and the lower housing 60, a height of the lower housing 60 needs to be set great, thereby resulting in waste of raw materials. In this way, a size of a mold of the lower housing 60 is also great so that a mold cost is increased, and a size of a packaging box for packaging the pet feeding device is also great, resulting in high packaging material costs. All the grain bowl 40, the guiding chute 80, and the support rod 93 of the present disclosure can be disassembled, which helps to reduce a volume of the packaging box. The current design on the market is the straight-tube structure, in order to ensure the height difference between the grain bowl 40 and the lower housing 60, it is necessary to set the height of the lower housing 60 greater, which wastes raw materials. The size of the mold of the lower housing 60 is great, the mold cost is great, and the size of the packaging box is also great, thereby greatly increasing the cost of packaging materials. The present disclosure ensures the height difference between the lower housing 60 and the grain bowl 40 through providing the support rod 93, reducing the size of the lower housing 60 and material costs. Both the support rod 93 and the guiding chute 80 are disassembled. When packaging the lower housing 60, removing the support rod 93 and the guiding chute 80 and then placing into the grain storage bin 10, which can reduce the total volume of the packaging box, thereby greatly reducing packaging material costs and transportation costs. An effect is more significant in terms of cross-border transportation costs, which can greatly reduce transportation costs.

The pet feeding device further includes a grain baffle 91 rotatably arranged in the grain storage bin 10 and configured to move the pet food in the grain storage bin 10 to the grain leakage mouth 11 and then further to leak into the grain inlet 21 of the pushing granary 20, and finally leak into the pushing granary 20. The grain shifting plate 91 is synchronously rotated with the grain pushing cover 70. The grain baffle 91 includes a short baffle 911 and a long baffle 912 that are arranged in a straight line. A length of the short baffle 911 is smaller than that of the long baffle 912, and the long shifting plate 912 extends from a middle of the grain storage bin 10 to a side wall of the grain storage bin 10. The length of the short baffle 911 extends to the grain leakage mouth 11, so as to move the pet food. However, when the pet food in the grain storage bin 10 is about to run out, there can be a small amount of pet food left at the bottom of the grain storage bin 10 near the side wall of the grain storage bin 10. At this time, the short baffle 911 can't function due to an insufficient length of the short baffle 911. At this time, the long baffle 912 can move the pet food at the edge of the grain storage bin 10 because the long baffle 912 extends to a position near the side wall of the grain storage bin 10, so as to fully move the pet food in the grain storage bin 10 to the grain leakage mouth 11.

The pet feeding device further includes a motor 92 arranged inside the lower housing 60 and synchronously connected to the grain pushing cover 70 and the grain baffle 91 in a transmission way. Specifically, both the grain pushing cover 70 and the grain baffle 91 of the present disclosure are driven by the same motor 92. When using the pet feeding device, the motor 92 rotates to drive both the grain pushing cover 70 and the grain baffle 91 to rotate, so that the pet food in the grain storage bin 10 leaks into the pushing granary 20 from the grain leakage mouth 11. At the same time, the grain pusher 30 on the grain pushing cover 70 also rotates to push the pet food inside the pushing granary 20 to the grain outlet 22, and then flows into the guiding chute 80 from the grain outlet 22; finally, the pet food flows from the guiding chute 80 into the grain bowl 40 for pet consumption. The present disclosure can implement an operation of the pet feeding device through a set of transmission structures, be of a simple structure and reduce the number of components.

In an optional embodiment of the present disclosure, the number of each of the grain leakage mouths 11, the grain outlets 22 and the grain bowls 40 is two, the two grain bowls 40 and the two grain outlets 22 are arranged one by one, and the two grain bowls 40 are arranged on opposite sides of the pet feeding device. The two grain bowls 40 of the present disclosure is arranged on opposite sides of the pet feeding device, in this way, when the pets consume the pet food, the pets can be blocked by the device, to avoid two pets from consuming the pet food within their sight range, to further reduce the occurrence of pet food grabbing. Furthermore, the present disclosure can distribute the pet food evenly through dual channels.

In some embodiments, the number of grain outlets 22 can be set to more than two, such as three grain outlets 22 and three grain bowls 40; alternatively, there are four grain outlets 22 and four grain bowls 40, each grain outlet 22 corresponds to one grain bowl 40, so that more pets are to conveniently use the pet feeding device simultaneously, and further enhance an application scenario of the pet feeding device of the present disclosure.

The pet feeding device includes a digital encoding switch 94 and a display screen 95 electrically connected to the digital encoding switch 94. A feeding plan can be set by rotating the digital encoding switch 94 and the specific feeding plan can be displayed through the display screen 95. For example, in one key feeding mode, pressing the digital encoding switch 3S to unlock the screen-a screen icon lights up, and at the same time, it defaults to the one key feeding pending state; rotating the digital encoding switch to cyclically switch a main menus of "one click feeding", "feeding plan", and "clock setting"; rotating the digital encoding switch to select FEEDING and click OK to enter the one click feeding settings. Simultaneously, displaying the pending setting status of feeding portions, increasing or decreasing the feeding portion by rotating the digital encoding switch, clicking OK again to confirm the current feeding portion, and feeding. For example, when setting the feeding plan, pressing the digital encoding switch 3S to unlock the screen, and the unlock icon lights up; rotating the digital encoding switch to select FEEDING PLAN and click OK to enter the feeding plan settings; at the same time, the clock display flashes to be set; rotating the digital encoding switch to set the clock, clicking OK, and automatically skipping to the minute settings; clicking OK and skipping to the feeding portion settings, a feeding time and the feeding portion for one or more meals can be set in sequence. The above one click feeding operation and feeding plan settings are just a few examples, and other mode settings can also be set. A principle of the digital encoding switch is based on conventional technologies, which is not repeated here. The settings on the market are usually multi-key operations, which is inconvenient for users. The present disclosure can be set through providing the digital coding switch, which can be operated with just one click, so that the pet feeding device of the present disclosure is conveniently operated and improves user experiences.

Figure 5:
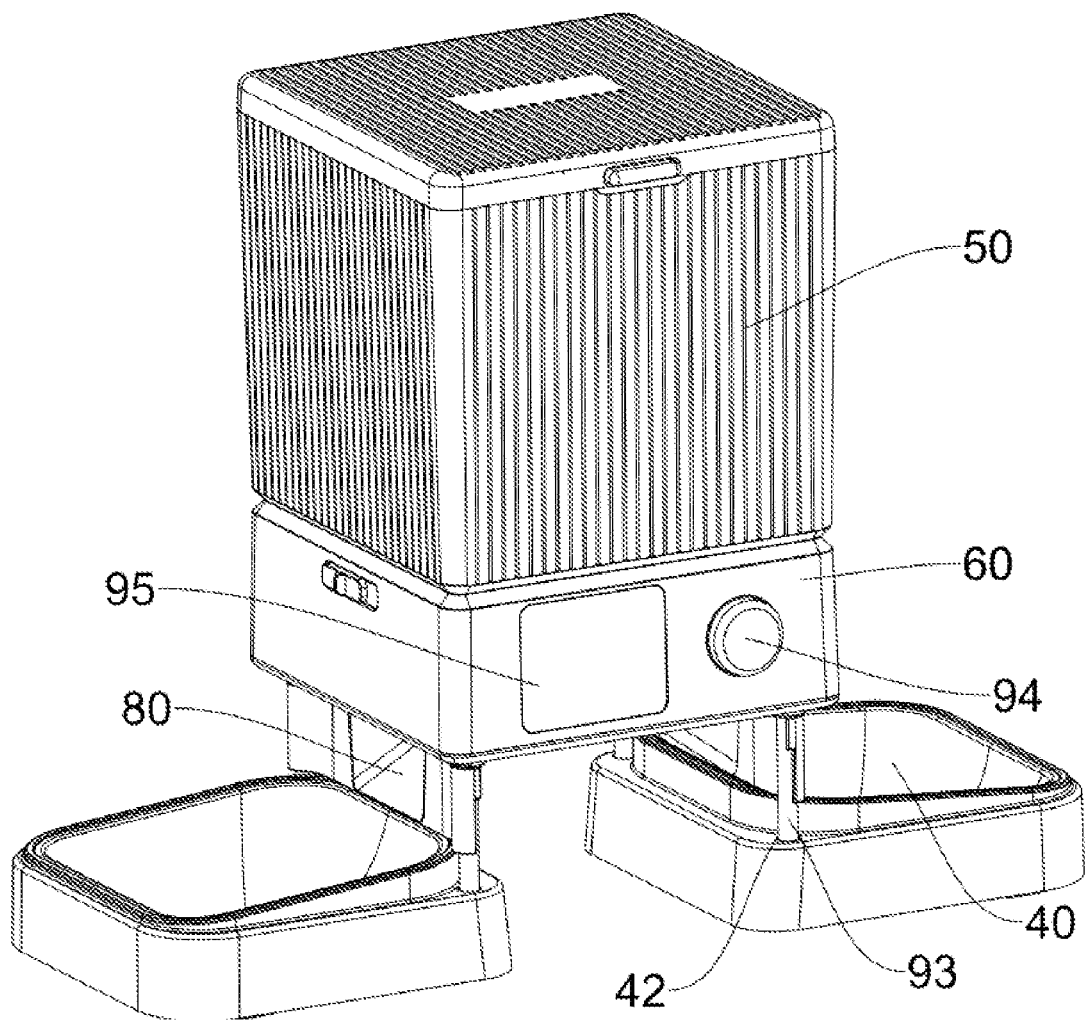
FIG. 5 is a schematic view of a pet feeding device in accordance with another embodiment of the present disclosure.
Figure 6:
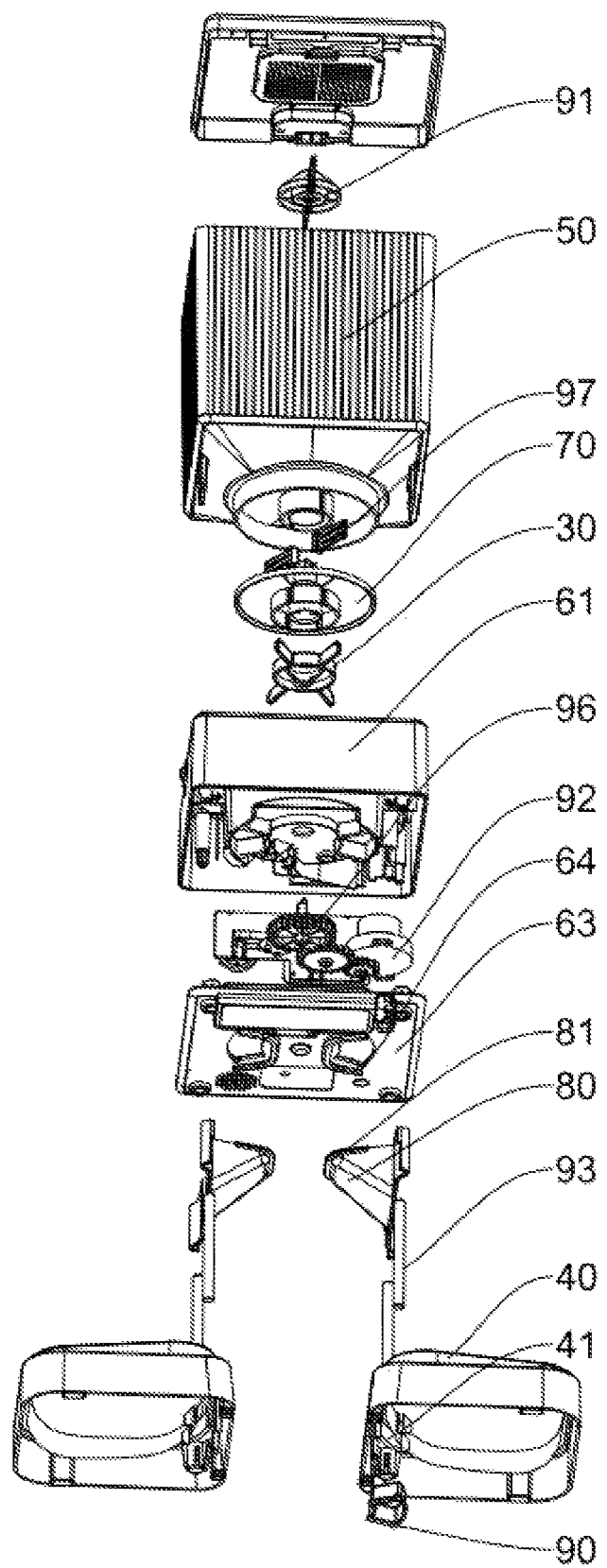
FIG. 6 is an exploded, schematic view of the pet feeding device of FIG. 5.
Figure 7:
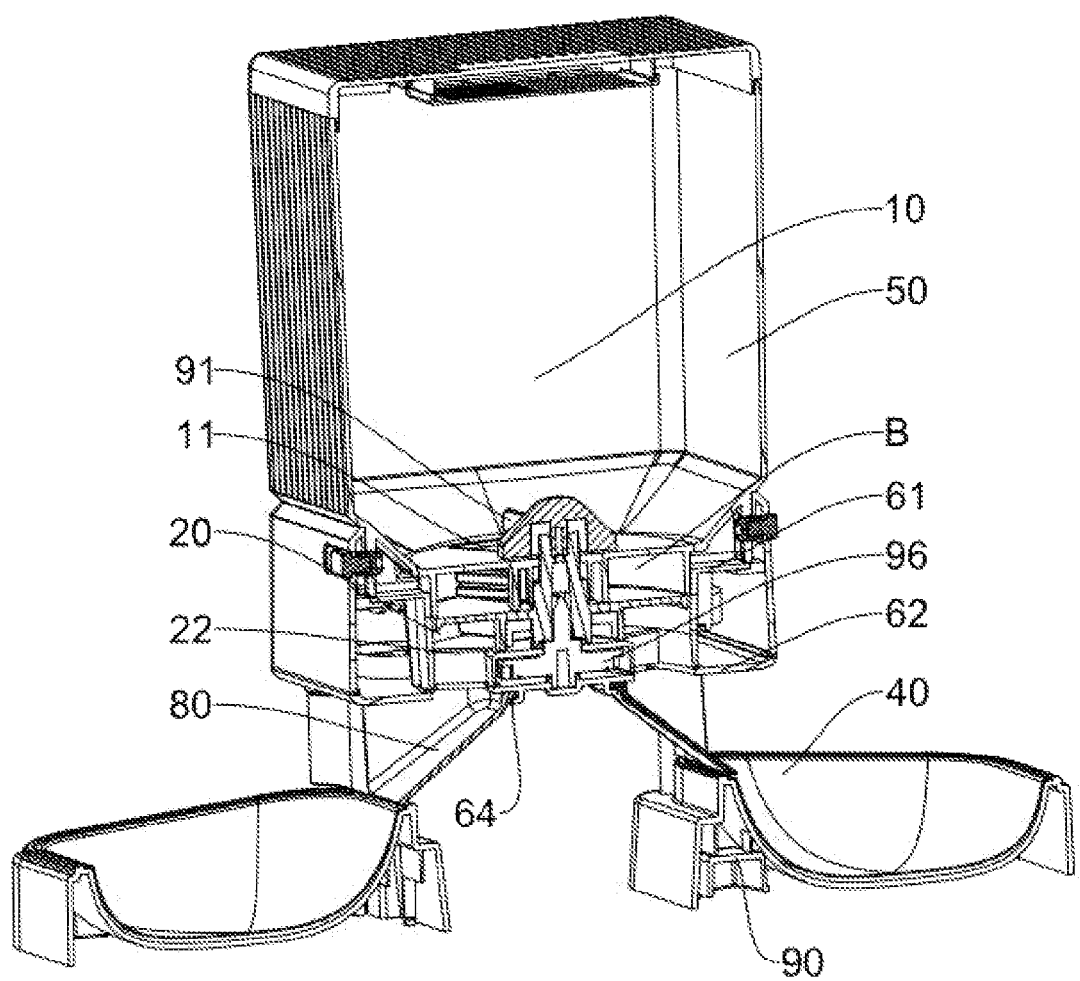
FIG. 7 is a cross sectional view of the pet feeding device of FIG. 5.
Figure 8:
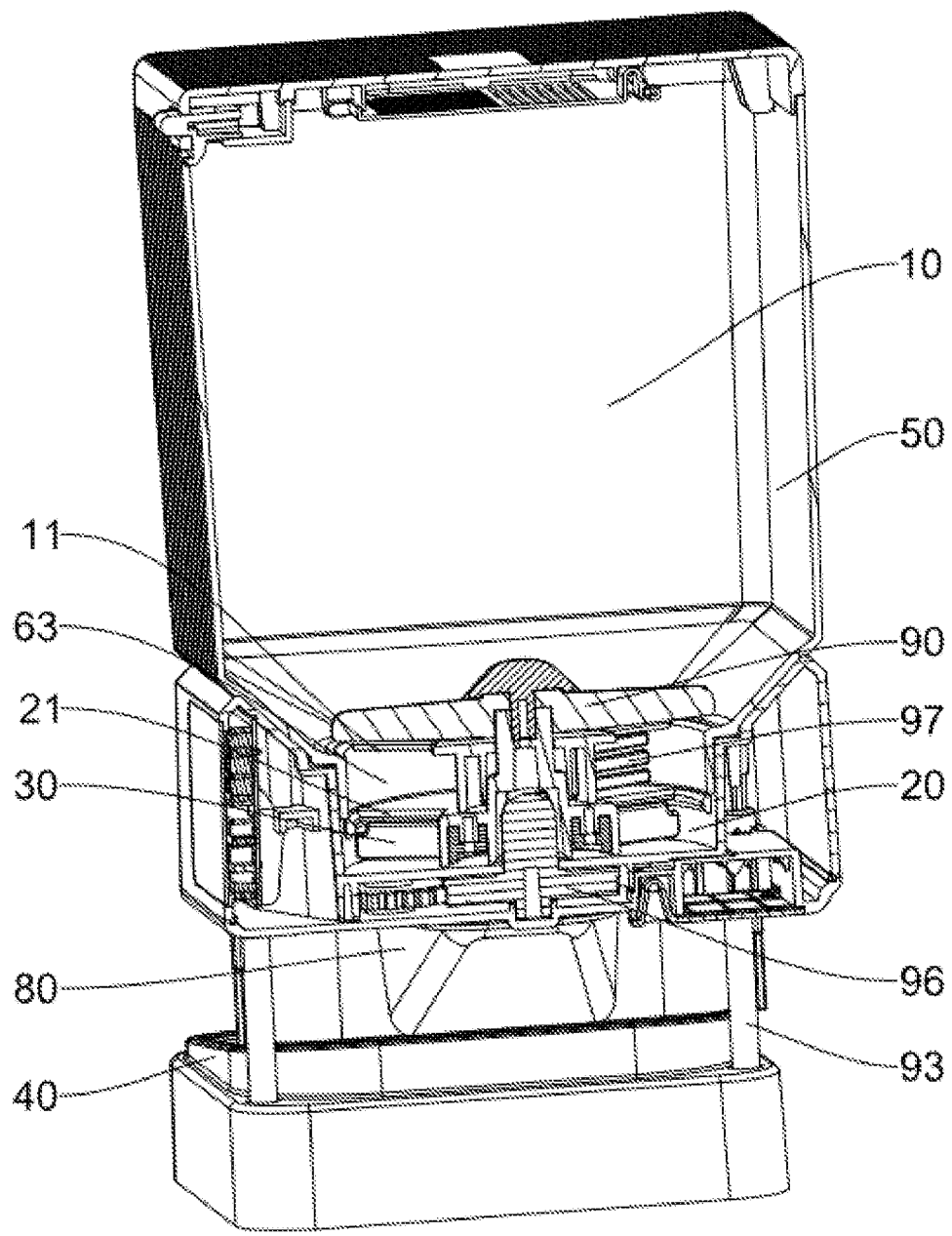
FIG. 8 is similar to FIG. 7, but shown from another view of FIG. 5.
Figure 9:
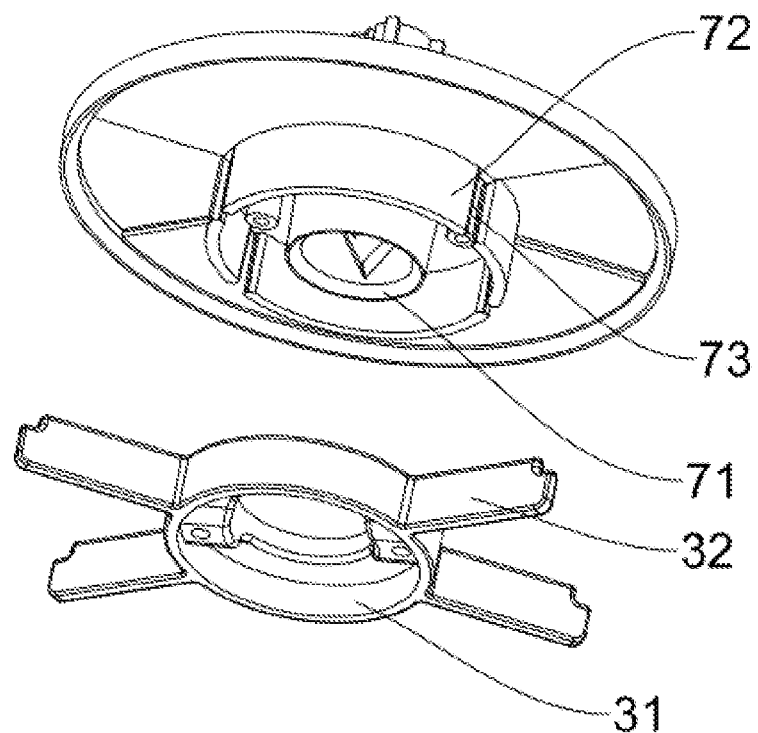
FIG. 9 is a schematic view of a grain pusher and a grain pushing cover of the pet feeding device of FIG. 5.
Figure 10:
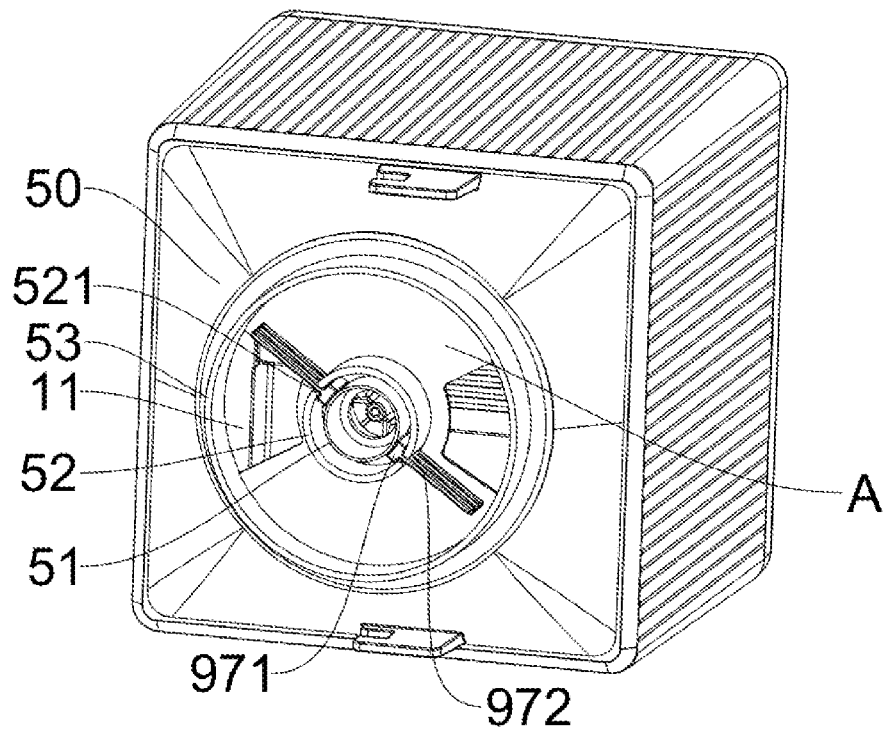
FIG. 10 is a schematic view of an upper housing and a grain baffling piece of the pet feeding device of FIG. 5.

Referring to FIG. 5 to FIG. 10, a pet feeding device according to another embodiment of the present disclosure includes a grain storage bin 10, a pushing granary 20, a grain pusher 30 and a grain bowl 40. The grain storage bin 10 includes a grain leakage mouth 11. The pushing granary 20 is arranged below the grain storage bin 10 and includes a grain inlet 21 and a grain outlet 22, the number of grain inlets 21 is consistent with the number of grain leakage mouths 11, and the grain inlet 21 is set above the grain outlet 22 and set above the pushing granary 20. The grain inlet 21 is set directly opposite to the grain leakage mouth 11 to facilitate pet food directly fall from the grain leakage mouth 11 into the pushing granary 20. The grain outlet 22 is arranged on the bottom of the pushing granary 20, and the grain outlet 22 and the grain inlet 21 are arranged in a staggered manner, so that the pet food leaked from the grain leakage mouth 11 will first deposit in the pushing granary 20, rather than directly leaking out of the grain outlet 22, which provides a buffering effect; and then, a volume of the pushing granary 20 is fixed, and the grain outlet 22 and the grain inlet 21 are arranged in a staggered manner, it is possible to roughly control an amount of the pet food pushed out from the grain outlet 22 each time, in order to facilitate quantitative control of pet food and promote healthy growths of the pets. The grain pusher 30 is rotatably arranged inside the pushing granary 20 and pushes the pet food that is received in the pushing granary 20 to the grain outlet 22 of the pushing granary 20, and finally leaks out from the grain outlet 22, when the grain pusher 30 rotate. The grain bowl 40 is arranged below the grain outlet 22 and configured to receive the pet food flowing out of the grain outlet 22 for pet consumption. The grain pusher 30 is made of a soft rubber material to ensure that there is no phenomenon of grain jamming. When a food jam occurs, an amount of the pet food pushed out of the grain outlet 22 will be affected, thereby affecting uniformity of the pet food delivery.

During operating the pet feeding device of the present disclosure, the pet food in the grain storage bin 10 first leaks into the grain inlet 21 of the pushing granary 20 from the grain leakage mouth 11, and then enters the pushing granary 20. Furthermore, the grain pusher 30 rotates to push the pet food in the pushing granary 20 to the grain outlet 22, and then flows from the grain outlet 22 into the grain bowl 40 below the grain outlet 22 for pet use. The grain pusher 30 is made of a soft rubber material, which prevents the pet food from being jammed during the process of pushing the pet food out of the pushing granary 20, so that the amount of grain discharged will be more uniform.

In an embodiment of the present disclosure, the pet feeding device further includes an upper housing 50, a grain baffle 91, a lower housing 60, a motor 92 and a transmission member 96. The upper housing 50 is installed above the lower housing 60. The grain baffle 91 is rotatably received in the upper housing 50, both the motor 92 and the transmission member 96 are arranged in the lower housing 60, the grain storage bin 10 is arranged in the upper housing 50, and the pushing granary 20 is arranged between the lower housing 60 and the upper housing 50. The motor 92 is connected to the transmission member 96 in a transmission manner, the transmission member 96 is arranged below the grain pusher 30 and also connected to the grain pusher 30 in a transmission manner, and the transmission member 96 is also connected to the grain baffle 91 in a transmission manner. The motor 92 drives the transmission member 96 to rotate, and then the transmission member 96 drives both the grain pusher 30 and the grain baffle 91 to rotate, so that the pet food in the upper housing 50 is pushed to the grain leakage mouth 11, and then the pet food in the pushing granary 20 is further pushed to the grain outlet 22. The present disclosure can implement an operation of the pet feeding device through a set of transmission structures, be of a simple structure and reduce the number of components.

In some embodiments of the present disclosure, the lower housing 60 includes a top shell 61 and a bottom shell 62 that are combined to form a receiving room for receiving the motor 92 and the transmission member 96 therein. The motor 92 is arranged above the bottom shell 62 and located on a side of the transmission member 96. Specifically, the motor 92 is installed on the bottom shell 62 and located on the side of the transmission member 96, that is, a transmission direction is horizontal. The motor 92 on the market is usually arranged below the transmission member 96, so that the transmission direction is vertical. A height of the entire device increases when the pet feeding device is transmitted along the vertical direction, thus increasing the packaging material and the packaging cost of the device. The motor 92 of the present disclosure is installed on the side of the transmission member 96, so that the height of the device is reduced, thereby reducing the packaging material and the packaging cost thereof.

The pet feeding device further includes a grain pushing cover 70 connected to the transmission member 96 in a transmission manner, so that the grain pushing cover 70 can rotate; the lower housing 60 includes a chamber 63, the grain pushing cover 70 arranged inside the chamber 63, and the pushing granary 20 formed between the grain pushing cover 70 and the chamber 63. The grain inlet 21 is arranged on the grain pushing cover 70 and the grain outlet 22 is arranged on a bottom wall A of the upper housing 50. The grain pushing cover 70 includes a first circular wall 71 and a second circular wall 72 concentrically arranged at intervals. A diameter of the first circular wall 71 is smaller than that of the second circular wall 72, and both the first circular wall 71 and the second circular wall 72 extend towards the chamber 63. The grain pusher 30 includes a first circular portion 31 and a plurality of pushing plates 32 integrated with the first circular portion 31, connected to a circumference of the first circular portion 31 and configured to push the pet food inside the pushing granary 20. The first circular portion 31 is sleeved on the first circular wall 71, a plurality of first grooves 73 is arranged on the second circular wall 72, and the plurality of pushing plates 32 correspondingly passes through the plurality of first grooves 73 so that the grain pusher 30 rotates synchronously with the push grain cover 70. When the motor 92 drives the transmission member 96 to rotate, the transmission member 96 drives both the grain pushing cover 70 and the grain pusher 30 to rotate synchronously. During the rotation of the grain pusher 30, the grain pusher 30 pushes the pet food inside the pushing granary 20 to move. Both the grain pushing cover 70 and the grain pusher 30 of the present disclosure are provided to reduce the height of the device, and further reduce the cost of packaging materials.

In an embodiment of the present disclosure, an outer diameter of the grain pushing cover 70 matches with an inner diameter of the chamber 63, and the pushing plate 32 is provided to separate the grain inlet 21 and the grain outlet 22. When the pushing plate 32 rotates, the pushing plate 32 pushes the pet food out of the pushing granary 20 and connects the grain inlet 21 with the grain outlet 22. The number of pushing plates 32 can be set to twice the number of grain inlets 21. For example, there is one grain inlet 21, and there are two pushing plates 32. The pushing plate 32 is set on both sides of the grain inlet 21, that is, the pushing plate 32 separates the pushing granary 20 into two parts. In an initial state, the pushing plate 32 blocks the grain inlet 21 and the grain outlet 22 to seal the grain storage bin 10 and some parts of the pushing granary 20, so as to increase a sealing performance of the device, and a better effect of moisture and insect prevention can be obtained by sealing the grain outlet 22 outside. When the pushing plate 32 rotates, the pet food is pushed out to the grain outlet 22. Specifically, all the grain pushing cover 70, two pushing plates 32, and side and bottom surfaces of the chamber 63 cooperatively seal the interior of the pushing granary 20. Only when the motor 92 runs to rotate the pushing plate 32, the pushing granary 20 can be connected with the grain outlet 22.

In an optical embodiment of the present disclosure, the pet feeding device also includes a plurality of grain baffling pieces 97, and a third circular wall 51, a fourth circular wall 52 and a fifth circular wall 53 are arranged coaxially on the bottom wall A of the upper housing 50. All the third circular wall 51, the fourth circular wall 52 and the fifth circular wall 53 are arranged towards the pushing granary 20, and a diameter of the third circular wall 51 is smaller than a diameter of the fourth circular wall 52, while the diameter of the fourth circular wall 52 is smaller than a diameter of the fifth circular wall 53. The fifth circular wall 53 is attached to the grain pushing cover 70, and an intermediate bin B is formed between the fifth circular wall 53 and the grain pushing cover 70. The plurality of grain baffling pieces 97 is arranged in the intermediate bin B and configured to move the pet food in the intermediate bin B. Each of the plurality of grain baffling pieces 97 includes a grain baffling portion 972 and a clamping portion 971 arranged between the third circular wall 51 and the fourth circular wall 52. The fourth circular wall 52 includes a plurality of second grooves 521, the grain baffling portion 972 passing through the plurality of second grooves 521. When the grain pushing cover 70 rotates, the grain baffling piece 97 is in a stationary state, so that the grain baffling piece 97 can move the pet food on the grain pushing cover 70 into the grain inlet 21, and then the pet food enters the pushing granary 20. In the embodiment of the present disclosure, the pushing granary 20 and the storage grain bin 10 are separated by the intermediate bin B. Although the grain inlet 21 is located directly below the grain leakage mouth 11, due to the height difference, the pet food will fall onto the grain pushing cover 70 (i.e. the pet food will fall into the intermediate bin B). The pet food in the intermediate bin B will be pushed to the grain inlet 21 through the grain baffling piece 97. In some embodiments, the grain baffling piece 97 is made of a soft rubber material to prevent occurrence of the pet food gamming in the intermediate bin B.

In an embodiment of the present disclosure, the pet feeding device further includes a guiding chute 80 and a plurality of support rods 93. The guiding chute 80 is arranged below the grain outlet 22 and configured to connect the grain outlet 22 and the grain bowl 40, so as to guide the pet food flowing from the grain outlet 22 into the grain bowl 40. The support rod 93 is arranged between the bottom shell 62 and the grain bowl 40 and configured to detachably connect the grain bowl 40 and the bottom shell 62. The bottom shell 62 includes an inserting member 64, and the guiding chute 80 includes an insertion portion 81 inserted into the inserting member 64. The insertion portion 81 and the inserting member 64 are provided to obtain detachable connection between the guiding chute 80 and the inserting member 64.

In some embodiments of the present disclosure, the pet feeding device includes a grain baffling piece 90 arranged between the guiding chute 80 and the grain outlet 22. The grain baffling piece 90 is configured to block one of the plurality of grain outlets 22. When there are few pets, the excess of grain outlets 22 are blocked to ensure that the pet food in the pushing granary 20 only leaks out from other grain outlets 22 that are unblocked, which increases a usage scenario of the present disclosure. When the plurality of grain bowls 40 is needed, the insertion portion 81 of the guiding chute 80 is pulled out of the inserting member 64, and then the grain baffling piece 90 is taken out. A clamping member 41 is arranged on a side of the grain bowl 40 facing the ground and configured to receive the grain baffling piece 90 to avoid a loss of the grain baffling piece 90.

In an optical embodiment of the present disclosure, the number of each of the grain outlets 22, the guiding chutes 80 and the grain bowls 40 is two, and the two grain bowls 40 are arranged on opposite sides of the lower housing 60.

Specifically, the two grain outlets 22 are respectively arranged on opposite sides of the lower housing 60, and each of the two grain outlets 22 matches with a corresponding guiding chute 80. One grain bowl 40 is arranged below each of the two grain outlets 22, in this way, the present disclosure can feed a plurality of pets at the same time. The two grain bowls 40 are respectively arranged on both sides of the lower housing 60 so that a farther distance between every two pets can be obtained. When the plurality of pets is fed, the lower housing 60 blocks views of both sides, thus avoiding the occurrence of pets competing for food. It is understandable that the number of grain bowls 40 can be set to more than two.

In some embodiments of the present disclosure, the pet feeding device includes a digital encoding switch 94 and a display screen 95 electrically connected to the digital encoding switch 94. A feeding plan can be set by rotating the digital encoding switch 94 and the specific feeding plan can be displayed through the display screen 95. The settings on the market are usually multi-key operations, which is inconvenient for users. The present disclosure can be set through providing the digital coding switch, which can be operated with just one click, so that the pet feeding device of the present disclosure is conveniently operated and improves user experiences.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure. Therefore, the protection scope of the present disclosure shall be subject to the protection scope of the claims.

What is claimed is:

1. A pet feeding device comprising:
a grain storage bin comprising at least two grain leakage mouths;
a pushing granary arranged below the grain storage bin and comprising at least two grain inlets and at least two grain outlets, the at least two grain outlets correspondingly arranged below the at least two grain inlets; the at least two grain inlets set directly opposite to the at least two grain leakage mouths respectively, and the at least two grain outlets and the at least two grain inlets arranged in a staggered manner;
a grain pusher rotatably arranged inside the pushing granary;
at least two grain bowls arranged below the at least two grain outlets respectively; and
wherein the grain pusher is configured to push pet food that is received in the pushing granary to the at least two grain outlets, and then flows into the at least two grain bowls respectively;
at least two guiding chutes correspondingly arranged between the at least two grain outlets and the at least two grain bowls, each of the at least two guiding chutes connected to both the grain outlet and the grain bowl to guide the pet food flowing out of the grain outlet into the grain bowl;
a lower housing and an upper housing arranged above the lower housing; the grain storage bin arranged inside the upper housing, the pushing granary arranged between the upper housing and the lower housing, and the grain outlets arranged on the lower housing;
the lower housing comprises an inserting member formed on a side of the lower housing facing the grain bowl, and the guiding chute comprises an insertion portion inserted into the inserting member so that the guiding chute is detachably connected with the lower housing through inserting the insertion portion into the inserting member;
a grain baffling piece is arranged between the guiding chute and the grain outlet and corresponding to the plurality of grain outlets, the grain baffling piece configured to block one of the plurality of grain outlets; and wherein a clamping member is arranged on a side of the grain bowl that faces the ground and configured to receive the grain baffling piece to avoid a loss of the grain baffling piece;
a grain pushing cover, and the lower housing comprises a chamber, the grain pushing cover rotatably received in the chamber, and the pushing granary formed between the grain pushing cover and the chamber; the grain pusher installed on the grain pushing cover and rotating synchronously with the grain pushing cover;
a grain baffle rotatably arranged in the upper housing and configured to move the pet food in the grain storage bin to the grain leakage mouth and then further to leak into the grain inlet;
a plurality of support rods is arranged between the lower housing and the two grain bowls, the plurality of support rods configured to connect the lower housing and the two grain bowls and provided to ensure a height difference between the lower housing and the grain bowl.

2. The pet feeding device as claimed in claim 1, wherein the number of each of the at least two grain outlets and the at least two grain bowls is two, the two grain bowls and the two grain outlets arranged one by one, and the two grain bowls arranged on opposite sides of the pet feeding device.

3. The pet feeding device as claimed in claim 1, wherein the pet feeding device comprises a digital encoding switch and a display screen electrically connected to the digital encoding switch; a feeding plan is set by rotating the digital encoding switch and the feeding plan is displayed through the display screen.

4. The pet feeding device as claimed in claim 1, wherein the grain pusher is made of a soft rubber material.

5. The pet feeding device as claimed in claim 1, wherein the grain pushing cover comprises a first circular wall and a second circular wall concentrically arranged at intervals; the grain pusher comprising a first circular portion and a plurality of pushing plates connected to a circumference of the first circular portion; the first circular portion sleeved on the first circular wall, a plurality of first grooves arranged on the second circular wall, and the plurality of pushing plates correspondingly passing through the plurality of first grooves; the pushing granary formed between the second circular wall and the chamber.

6. The pet feeding device as claimed in claim 5, wherein the pet feeding device comprises a plurality of grain baffling pieces; the upper housing comprising a third circular wall and a fourth circular wall coaxially arranged on a bottom wall of the upper housing, and extending towards the grain pushing cover; and wherein
each of the plurality of grain baffling pieces comprises a grain baffling portion and a clamping portion arranged between the third circular wall and the fourth circular wall, the fourth circular wall comprising a plurality of second grooves, and the grain baffling portion passing through the plurality of second grooves.

7. The pet feeding device as claimed in claim 6, wherein the upper housing comprises a fifth circular wall arranged on the bottom wall of the upper housing and extending towards the grain pushing cover, an intermediate bin formed between the fifth circular wall and the grain pushing cover, the plurality of grain baffling pieces received in the intermediate bin and configured to move the pet food that is received in the intermediate bin.

8. The pet feeding device as claimed in claim 7, wherein the pet feeding device further comprises a motor and a transmission member arranged in the lower housing, respectively, the motor connected to the transmission member in a transmission manner, the transmission member arranged below the grain pusher and also connected to the grain pusher in a transmission manner, and the transmission member also connected to the grain baffle in a transmission manner, wherein the motor drives the transmission member to rotate, and then the transmission member drives both the grain pusher and the grain baffle to rotate, so that the pet food in the upper housing is pushed to the grain leakage mouth, and then the pet food in the pushing granary is further pushed to the grain outlet.

9. The pet feeding device as claimed in claim 8, wherein a diameter of the first circular wall is smaller than that of the second circular wall, and both the first circular wall and the second circular wall extend towards the chamber.

10. The pet feeding device as claimed in claim 9, wherein an outer diameter of the grain pushing cover matches with an inner diameter of the chamber, and the plurality of pushing plates is provided to separate the grain inlets and the grain outlets, wherein when the pushing plate rotates, the plurality of pushing plates pushes the pet food out of the pushing granary and connects the grain inlets with the grain outlets; and wherein a number of pushing plates is set to twice the number of grain inlets.

11. The pet feeding device as claimed in claim 10, wherein a diameter of the third circular wall is smaller than a diameter of the fourth circular wall, and the diameter of the fourth circular wall is smaller than a diameter of the fifth circular wall.

* * * * *